Patented Apr. 12, 1949

2,466,670

UNITED STATES PATENT OFFICE 2,466,670

AMIDES OF N-(2,3-DIHYDROXY-2-PRO-PENYLIDENE)-AMINOBENZOIC ACID

Robert B. Angier, Pearl River, N. Y., assignor, by mesne assignments, to American Cyanamid Company, New York, N. Y., a corporation of Maine No Drawing. Application November 29, 1945, Serial No. 631,793

11 Claims. (Cl. 260—519)

1

This invention relates to new organic compounds and to processes of preparing the same.

I have found that new and useful organic compounds may be prepared by the reaction of reductone and amides of aminobenzoic acid. The reaction may be illustrated by the following equation:

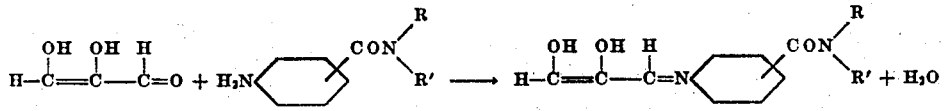

in which R and R' are hydrogen or aliphatic or aromatic radicals.

Generally speaking, the compounds of the present invention are pale yellow to reddish brown crystalline solids, difficultly soluble in water and organic solvents. Some are useful as intermediates in preparing compounds possessing biological activity, such as growth stimulants, while others are useful for other purposes.

Of the reactants, reductone (2,3-dihydroxy acrylaldehyde) is a known compound and may be prepared by methods which have been described in the chemical literature. As will be obvious, this compound, as well as the reductone moiety of the final product, may exist in tautomeric form.

The new compounds of the present invention are obtained by using as intermediates in the above noted reaction an amide of aminobenzoic acid. These intermediates include ortho, meta, and para-aminobenzamide and other amides of aminobenzoic acid in which R and/or R' in the general formula may be hydrogen, aliphatic or aromatic radicals such as ethyl, ethanol, dodecyl, ethylhexyl, benzyl, phenyl, etc. or those in which R and R' together form a closed ring.

Of the various amides of aminobenzoic acid that may be employed as intermediates in the process, the most important appear to be those of amino acids, particularly of glutamic acid, as, for example, p-aminobenzoylglutamic acid and aminobenzoic amides having one or more peptide linkages such as p-aminobenzoylglutamylglutamic acid, p-aminobenzoylglutamylglutamylglutamic acid and others in which the polypeptide is made up of one or more of the various amino acids, such as p-aminobenzoylglutamylglycylglutamic acid. Of course, amides of p-aminobenzoic acid and other amino acids such as glycine, aspartic acid, leucine, alanine, isovaline, cysteine, and the like, are also important intermediates. The amides may be of amino acids

2 which are either natural or synthetic and which may occur in any of the d, l, or dl forms. As these amino acid amides possess free carboxyl groups, it will be apparent that the salts and esters thereof may likewise be employed.

In preparing the compounds of the present invention the reactants are usually dissolved or suspended in a solvent such as water, ethyl alcohol, acetone, benzene, chloroform, etc. or mixtures thereof.

The reaction may take place over a wide range of temperatures, from 2 or 3° C. up to 80° C. or higher, and is usually complete in from about 1 or 2 hours up to about 36 hours, although the major part of the reaction is over within a few minutes. Cooling of the reaction solution aids separation of the product.

The invention will now be described in greater particularity by means of the following examples in which various reaction conditions and reactants are shown. It will be understood, of course, that the invention is not limited to the particular details of these examples since other reaction conditions and reactants within the skill of the art may be employed to produce new and useful compounds falling within the scope of the present invention.

Example 1

To 25 cc. of water at 50°–60° C. was added 0.2 g. of reductone and the temperature maintained for about 15 minutes. After cooling to room temperature three drops of concentrated hydrochloric acid was added followed by 0.5 g. of p-aminobenzoylglutamic acid. After stirring for ten minutes the solution was placed in a refrigerator and an oil slowly separated. On standing several weeks the oil solidified to a red solid. The solid was filtered, washed with methanol and ether, and dried. It is very slightly soluble in hot water and soluble in hot ethylene glycol but insoluble in most organic solvents. The compound melts with decomposition at 190°–195° C. The product N-(2,3-dihydroxy-2-propenylidene)-p-aminobenzoylglutamic acid is of sufficient purity for use as an intermediate.

Example 2

Five grams of reductone was dissolved in 100 cc. of water at about 60° C. for fifteen minutes and then cooled to room temperature. This solution was added to a mixture of 16 g. of diethyl p-aminobenzoylglutamate, 7 cc. of concentrated hydrochloric acid, 1600 cc. of water and 100 cc. of ethanol. The mixture was stirred rapidly at room temperature for several hours and placed in the refrigerator overnight. The precipitate which settled out was removed by filtration, washed once with ether, and dried. A yield of 16.7 g. of diethyl N-(2,3-dihydroxy-2-propenylidene)-p-aminobenzoylglutamate was obtained. The compound is insoluble in water and petroleum ether, slightly soluble in ether, soluble in hot ethylene glycol and very soluble in cold ethanol and chloroform. The product when crystallized from chloroform and petroleum ether was yellow and melted at 119°–123° C. (uncorr.) with decomposition.

Example 3

The preceding example was repeated with the exception that the diethyl p-aminobenzoylglutamate was dissolved in the ethanol and then added slowly to the solution of reductone in water, instead of adding all the reactants at once. The identical product was obtained in approximately the same yield.

Example 4

Five grams of reductone was dissolved in 100 cc. of water at about 60° C. for fifteen minutes and then cooled to room temperature. This solution was added to a mixture of 16 g. of diethyl p-aminobenzoyl glutamate, 7 cc. of acetic acid and 1600 cc. of water. The mixture was stirred rapidly at room temperature for several hours and placed in the refrigerator overnight. The precipitate which settled out was removed by filtration, washed once with ether and dried. The product obtained was of sufficient purity for use as an intermediate in other chemical reactions.

Example 5

0.28 grams of reductone was depolymerized by dissolving in 30 cc. of water and heating to 60° C. for 15 minutes. The solution was cooled to room temperature and 3 drops of concentrated hydrochloric acid was added. To this was added 0.35 grams of p-aminobenzamide and the solution stirred vigorously for 20 minutes. After standing an additional hour this was filtered, washed with water, methanol and ether, and dried. Yield of orange crystalline product —0.48 grams 91% yield).

This compound is very slightly soluble in hot ethanol, soluble in hot water and hot ethylene glycol. It is insoluble in benzene, chloroform and ether. The compound decomposes slowly without melting above 200° C. It requires no purification for further use as an intermediate in many reactions.

Example 6

This reaction was run in the same manner as in Example 5 using 0.3 grams of reductone and 0.6 grams of N-(p-aminobenzoyl) glycine. Yield of orange product was 0.77 grams (94% yield). This compound is slightly soluble in hot ethylene glycol and very slightly soluble in hot water but insoluble in most organic solvents. It has no melting point but decomposes slowly without melting above 220° C. The chemical analysis checked very well for N-(2, 3-dihydroxy-2-propenylidene)-p-aminobenzoylglycine.

Example 7

This reaction was run in the same manner as in Example 5 using 0.2 grams of reductone and 0.6 grams of ethyl N-(p-aminobenzoyl) glycinate. Yield of orange-yellow crystalline material was 0.58 grams (74% yield). This compound was recrystallized twice from ethanol using Norite to decolorize it. The product is a deep yellow crystalline compound. It is insoluble in water, petroleum ether, chloroform and ether. It is very slightly soluble in hot benzene and moderately soluble in methanol, ethanol and dioxane.

I claim:

1. Compounds having the general formula:

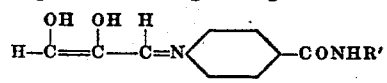

in which NHR' is the radical of an aliphatic amino acid.

2. A product in accordance with claim 1 in which the amino acid is glutamic acid.

3. A product in accordance with claim 1 in which the amino acid is aspartic acid.

4. Compounds having the general formula:

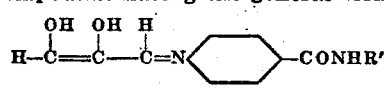

in which NHR' is the radical of an aliphatic amino acid having a peptide linkage.

5. A product in accordance with claim 4 in which the amino acid is glutamylglutamic acid.

6. A method of preparing compounds having the general formula

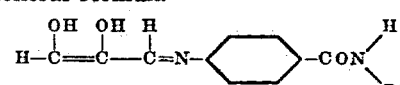

in which R' is a member of the group consisting of hydrogen and the radical of an aliphatic amino acid which comprises mixing together in a solvent of the group consisting of inert organic solvents and water, reductone and an amide of aminobenzoic acid having the formula

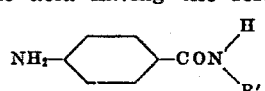

in which R' is as defined above, and thereafter recovering the said product.

7. A method of preparing compounds having the general formula

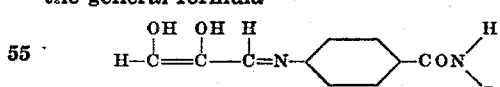

in which R' is a member of the group consisting of hydrogen and the radical of an aliphatic amino acid which comprises mixing together reductone and an amide of p-aminobenzoic acid having the formula

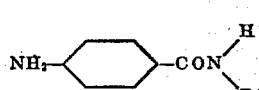

in which R' is as defined above, in a solvent of the group consisting of inert organic solvents and water, under acidic conditions between 2° and 80° C. and thereafter recovering the said product.

8. A method in accordance with claim 7 in which the amide of p-amino-benzoic acid is that of an aliphatic amino acid.

9. A method in accordance with claim 7 in which the amide of p-amino-benzoic acid is that of glutamic acid.

10. A method in accordance with claim 7 in which the amide of p-amino-benzoic acid is that of aspartic acid.

11. A method in accordance with claim 7 in which the amide of p-amino-benzoic acid is that of glutamylglutamic acid.

ROBERT B. ANGIER.

REFERENCES CITED

The following references are of record in the file of this patent:

Euler et al., Chem. Abstracts, vol. 28, col. 3382 (1934).